United States Patent
Kadatch et al.

(10) Patent No.: US 7,634,592 B2
(45) Date of Patent: *Dec. 15, 2009

(54) METHOD, SYSTEM, AND PROGRAM FOR HIBERNATION OF COMPUTER SYSTEMS HAVING DMA CONTROLLER TO ASYNCHRONOUSLY READ DATA FROM BUFFERS

(75) Inventors: Andrew V. Kadatch, Redmond, WA (US); James E. Walsh, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 1101 days.

This patent is subject to a terminal disclaimer.

(21) Appl. No.: 11/010,498

(22) Filed: Dec. 13, 2004

(65) Prior Publication Data

US 2005/0097239 A1    May 5, 2005

Related U.S. Application Data

(62) Division of application No. 09/814,474, filed on Mar. 21, 2001, now Pat. No. 6,883,037.

(51) Int. Cl.
*G06F 3/00* (2006.01)
(52) U.S. Cl. .............................. 710/22; 710/20; 710/31; 710/32; 710/5; 710/66; 713/300; 713/321; 713/323; 713/330; 718/100; 718/102; 718/106; 711/100; 711/156; 711/162
(58) Field of Classification Search ................ 710/5, 710/22, 31, 32, 66, 20; 713/300, 321, 323, 713/330; 711/100, 156, 162; 718/100, 102, 718/106
See application file for complete search history.

(56) References Cited

U.S. PATENT DOCUMENTS 4,398,299 A    8/1983  Darling et al. ................. 375/8

(Continued)

FOREIGN PATENT DOCUMENTS

JP    02001022464    1/2001

OTHER PUBLICATIONS

Buren et al., "A Micro Processing System Managing the IEC-Bus," Conference on Microprocessors in Automation and Communications, pp. 395-402 (Sep. 1978).

(Continued)

*Primary Examiner*—Tammara Peyton
(74) *Attorney, Agent, or Firm*—Workman Nydegger

(57) ABSTRACT

An improved hibernation method and system, including the use of a modified DMA (Direct Memory Access) mode of transferring data to and from the disk. The use of DMA increases data transfer speed, while freeing the system processor to perform other tasks, including compressing/decompressing the data transferred to and from the disk. An improved decoder is also provided that reduces the number of bounds checks needed on average for typical compressed data by first guaranteeing that there is sufficient room to decode literals and small substrings, whereby bounds checking is not needed. A combination hibernation mode and a suspend mode is also provided that essentially maintains power to the RAM while transparently backing the RAM with the hibernation file, such that if power to the RAM is interrupted, the RAM contents are automatically restored from the hibernation file when power is restored.

2 Claims, 13 Drawing Sheets

U.S. PATENT DOCUMENTS

| | | | | |
|---|---|---|---|---|
| 5,021,983 | A | * | 6/1991 | Nguyen et al. ............... 713/321 |
| 5,497,494 | A | * | 3/1996 | Combs et al. ............... 713/323 |
| 5,509,124 | A | | 4/1996 | Bourke et al. ............... 395/280 |
| 5,666,540 | A | | 9/1997 | Hagiwara |
| 5,708,820 | A | * | 1/1998 | Park et al. ............... 713/323 |
| 5,841,696 | A | | 11/1998 | Chen et al. ............... 365/185.11 |
| 5,875,310 | A | | 2/1999 | Buckland et al. ............... 395/306 |
| 5,925,129 | A | * | 7/1999 | Combs et al. ............... 713/300 |
| 6,092,140 | A | | 7/2000 | Tausheck ............... 710/128 |
| 6,434,648 | B1 | | 8/2002 | Assour et al. ............... 710/102 |
| 6,546,472 | B2 | | 4/2003 | Atkinson |
| 6,611,919 | B1 | | 8/2003 | Matsuya |
| 6,647,472 | B2 | * | 11/2003 | Atkinson et al. ............... 711/158 |
| 6,678,712 | B1 | | 1/2004 | McLaren |
| 6,732,280 | B1 | * | 5/2004 | Cheok et al. ............... 713/300 |
| 6,792,550 | B2 | * | 9/2004 | Osecky et al. ............... 713/300 |

OTHER PUBLICATIONS

Fisher, Eugene, "Speed Microprocessor Responses," Electronic Design, vol. 23, No. 23, pp. 78-82, (Nov. 1975).

Oberhumer, Markus F.X.J., "LZO Data Compression Library," ftp://ftp.freesoftware.com/pub/infozip/index.html printed Mar. 9, 2001.

Adler et al., About Info ZIP Home Page http://wilodsau.idv.uni-linz.ac.at/mfx/lzo.html Printed Mar. 9, 2001.

Shankar, S. "Data Transfer By Cycle Stealing in the 8080," Electronic Engineering (London), vol. 51, No. 624, pp. 20-21 (Jun. 1979).

Ziv et al., "A Universal Algorythym for Sequential Data Compression," IEEE Transaction on Information Theory, vol. 23, No. 3, pp. 337-343 (May 1977).

IBM-TDB—"Hibernating and Resuming Using a Compressed Memory Image", Aug. 1, 1995, pp. 73-74, vol. 38, Issue 8.

IBM-TDB—"Automatic Data Compression Control for Hibernation", Apr. 1, 19996, pp. 185-186, vol. 39, Issue 4.

Notice of Allowance dated Sep. 20, 2007 cited in U.S. Appl. No. 11/010,504 (Copy Attached).

Notice of Allowance mailed Jun. 13, 2007 in related U.S. Appl. No. 11/010,504.

Buren et al., "A Micro Processing System Managing the IEC-Bus," Conference on Microprocessors in Automation and Communications, pp. 395-402 (Sep. 1978).

Fisher, Eugene, "Speed Microprocessor Responses," Electronic Design, vol. 23, No. 23, pp. 78-82, (Nov. 1975).

Oberhumer, Markus F.X.J., "LZO Data Compression Library," ftp://ftp.freesoftware.com/pub/infozip/index.html printed Mar. 9, 2001.

Adler et al., About Info ZIP Home Page http://wilodsau.idv.uni-linz.ac.at/mfx/lzo.html Printed Mar. 9, 2001.

Shankar, S. "Data Transfer By Cycle Stealing in the 8080," Electronic Engineering (London), vol. 51, No. 624, pp. 20-21 (Jun. 1979).

Ziv et al., "A Universal Algorythym for Sequential Data Compression," IEEE Transaction on Information Theory, vol. 23, No. 3, pp. 337-343 (May 1977).

* cited by examiner

METHOD, SYSTEM, AND PROGRAM FOR HIBERNATION OF COMPUTER SYSTEMS HAVING DMA CONTROLLER TO ASYNCHRONOUSLY READ DATA FROM BUFFERS

CROSS-REFERENCE TO RELATED APPLICATION

This is a divisional of U.S. patent application Ser. No. 09/814,474 filed Mar. 21, 2001.

FIELD OF THE INVENTION

The present invention is generally directed to computer systems, and more particularly to preserving the state of computer systems when the computer is shut down.

BACKGROUND OF THE INVENTION

Hibernation of computer systems generally refers to powering down a computer in a special way that preserves the state of the computer's configuration. Hibernation works by saving the volatile memory contents to a file on the computer's hard disk drive before shutting down. When power is restored, the file is read back into the memory and device states and services are restored, whereby the computer resumes the state it was in just before the hibernation, i.e., as if power was never turned off. Hibernation is especially popular for powering off mobile computers (e.g., notebooks and laptops) and other computers that are frequently turned on and off, because, unlike shutdown, hibernation automatically preserves opened documents, desktop settings, and other resources that have not been otherwise saved. In addition, a resume from hibernated state is often much faster than a full system startup. Hibernate is also preferable in many instances over a suspend mode that preserves the memory's contents by providing sufficient power to the RAM, because in suspend mode the RAM contents are lost if power is ever interrupted.

While hibernation is thus a valued feature, it is relatively slow because of the large amounts of data (e.g., in contemporary systems the memory is typically at least sixty-four megabytes) that need to be transferred to and from the disk. Hibernation takes on the order of twenty to forty seconds for entering hibernation and ten to fifteen seconds to resume from hibernation, depending on the model of the hard disk and the amount of installed memory. Many users are unsatisfied with the amount of time the hibernation process takes, and indeed, virtually every user of this feature would prefer that it was a faster process.

SUMMARY OF THE INVENTION

Briefly, the present invention provides an improved hibernation method and system, including the use of a modified DMA (Direct Memory Access) mode of transferring data to (and from) the disk. The modified DMA mode increases data transfer speed, while also freeing the system processor to perform other tasks, including compressing the data to reduce the size of the data that needs to be transferred to (and later from) the disk. For data that is compressed, the present invention also provides an improved decompression mechanism that speeds resume time. The present invention also provides a special mode that is a combination of a hibernation mode and a suspend mode. This mode essentially maintains power to the RAM while transparently backing the RAM with the hibernation file, such that if power to the RAM is interrupted, the RAM contents are automatically restored from the hibernation file when power is restored.

The use of modified DMA for transferring data to and from disk is significantly faster than programmed input/output (PIO), and also frees the processor to perform other tasks while the hard disk controller transfers the data to and from the disk. To accomplish hibernation with DMA while not changing the contents of the memory that are to be preserved, the present invention uses a special, modified DMA engine (including an asynchronous polling I/O protocol) that works by, among other things, polling a hard disk controller status register instead of relying on interrupts to signal the completed status. Between polling cycles, the compression or decompression tasks are performed by the processor. Moreover, the hibernation engine is able to use system software services (e.g., drivers) required by DMA without changing the contents of the memory to be preserved. To this end, memory devoted for internal driver data structures is allocated in a hibernation-safe memory location or locations, I/O buffer locations are moved into the safe memory range, buffer alignment is controlled, and large I/O requests are split into sequences of smaller ones. More particularly, the hibernation engine communicates with the hard disk controller driver and DMA driver to obtain the hardware and software requirements, e.g., including, what is the largest size I/O request that the hardware handles, the amount of memory needed for the driver's internal structures, the region of memory where an I/O buffer should be located, and what the I/O buffer alignment should be. In this manner, the drivers do not access memory outside of that reserved for hibernation, and data integrity is preserved.

The resume (from hibernation) process has also been sped up by an improved decoding process, that eliminates a substantial amount of the bounds checking normally necessary with decompression buffers, yet operates safely within the buffers. To this end, a two-phase LZ77 decoder includes a fast first phase that first guarantees sufficient room for decoding small symbol substrings and literal symbols, thus avoiding the need to check boundary limits before copying the literal symbol or substring as a whole. Because literal symbols and small substrings of symbols form the majority of compressed data, the reduced checking on average significantly speeds up decoding. When the end of the output buffer is neared, a second-phase, standard decoder is used that performs bounds checks on each symbol to ensure that the buffer does not overflow. However, the standard decoder is normally used for decompressing only a small amount of data after a much larger amount of data has been decompressed with the fast decoder. In this manner, speed is greatly improved while not compromising safety that is needed in a reliable decoder.

Other objects and advantages will become apparent from the following detailed description when taken in conjunction with the drawings, in which:

DETAILED DESCRIPTION

Exemplary Operating Environment

Figure 1:
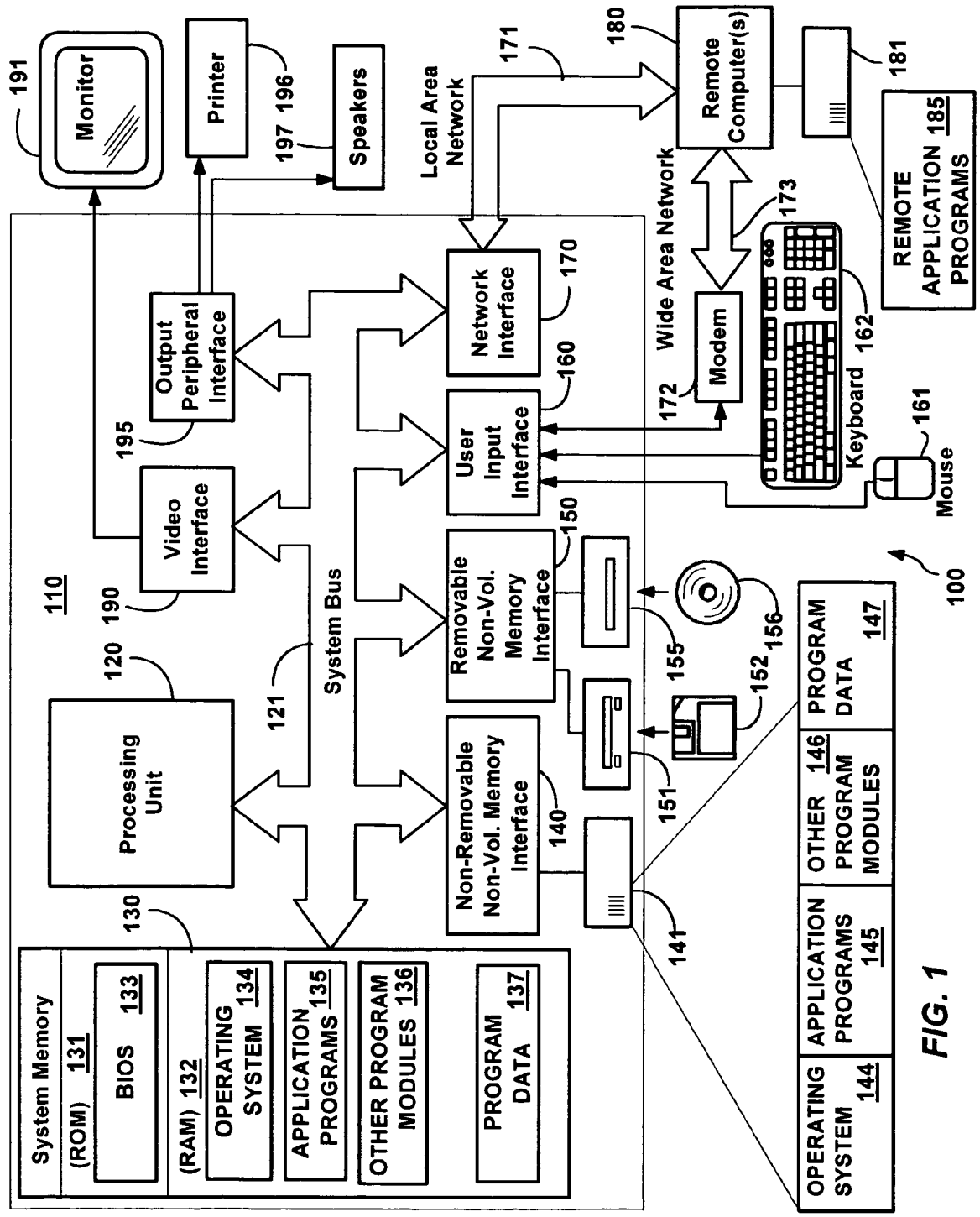
FIG. 1 is a block diagram representing a computer system into which the present invention may be incorporated.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Components of the computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 110 typically includes a variety of computer-readable media. Computer-readable media can be any available media that can be accessed by the computer 110 and includes both volatile and nonvolatile media, and removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 110. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136 and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface (e.g., hard disk controller) 140, and magnetic disk drive 151 and optical disk drive 155 are typically connected to the system bus 121 by a removable memory interface, such as interface 150.

The drives and their associated computer storage media, discussed above and illustrated in FIG. 1, provide storage of computer-readable instructions, data structures, program modules and other data for the computer 110. In FIG. 1, for example, hard disk drive 141 is illustrated as storing operating system 144, application programs 145, other program modules 146 and program data 147. Note that these components can either be the same as or different from operating system 134, application programs 135, other program modules 136, and program data 137. Operating system 144, application programs 145, other program modules 146, and program data 147 are given different numbers herein to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through a output peripheral interface 190.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet. When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Improved Hibernation

The present invention is generally directed to improved hibernation in a number of ways, including by performing faster data transfer. To this end, DMA (direct memory access) may be used when transferring data to and from a hard disk. To use DMA while benefiting from already existing components, the present invention has been implemented using selected drivers in the Windows® 2000 operating system. As will be understood, however, the present invention is not limited to any particular operating system and/or drivers or even a driver model, but rather is capable of being implemented by virtually any mechanism in any type of system.

In general, DMA refers to a fast way of reading or writing data from memory to a peripheral device. With a disk, DMA operates essentially by providing a hard disk controller 140 (FIG. 2) with the various parameters it needs to access the appropriate memory and hard disk 141 locations, and then letting the hard disk controller 140 asynchronously perform the read or write operation. In contrast, programmed input/output (I/O) is an alternative way to transfer data to and from a disk, but is much slower than DMA. In programmed I/O, the system processor 120 is responsible for executing the instructions that transfer the data to and from the disk 141.

Programmed I/O requires significant overhead, and moreover, requires work from the system processor 120, which prevents the system processor 120 from doing other tasks while it performs the programmed I/O. Note that multithreaded operation is not allowed during hibernation, as the operating system components that control threading need to be effectively shut down to safely perform hibernation.

Despite its drawbacks, programmed I/O was heretofore used exclusively for entering and resuming from hibernation. This is because it was not believed to be possible to use DMA with hibernation for a number of reasons that are essentially related to preserving the exact state of the system memory, i.e., the memory contents cannot be changing once hibernation has started (except for special working location or locations allocated to hibernation). More particularly, one reason that it was not believed possible to use DMA during hibernation is that interrupts need to be disabled to prevent any modification to the system memory. However, DMA/the hard disk controller 140 use interrupts to asynchronously notify the system processor of the status (e.g., completed or failed) of requested input-output operations. Another reason why DMA is not implemented with hibernation is that DMA and hard disk controller drivers require various amounts of memory to perform their operations, which in contemporary systems is virtual memory that is provided by mapping the virtual memory address to a physical memory location and swapping the existing physical memory contents to disk to preserve them for another process. However, since memory cannot be changed during hibernation, swapping is also disabled during hibernation, to "freeze" the memory contents. Similarly, existing DMA controllers/drivers work with operating system services that also need to allocate and modify memory, which is forbidden during hibernation, and thus those services are not available for use with hibernation. The hard disk controller 140 also works with drivers that use operating system services and need to allocate and modify memory.

In accordance with one aspect of the present invention, a fast hibernation engine 200 (FIG. 2) provides a controlled manner of using DMA that does not require interrupts and also does not allow memory modification, other than in a special safe section (or sections) of memory 202 allocated for hibernation. This frees the system processor 120 to perform other tasks while the system hardware (DMA controller 204 and hard disk controller 140) perform the requested data transfer operation. In particular, to further reduce the transfer times, the memory contents are compressed upon write to the hibernation file 206, and decompressed upon read, whereby only a reduced amount of data needs to be transferred. For example, writing less data via parallel compression in accordance with the present invention has been shown to significantly reduce the time to enter hibernation, from approximately twenty to forty seconds without the present invention, to about seven to ten seconds with the present invention, (wherein the time ranges are caused by different models of hard disks and the amount of installed memory 132).

To provide DMA in conjunction with preventing the memory from changing via interrupts, interrupts are disabled during hibernation. However, DMA is possible without interrupts in most systems because most contemporary disk hardware (the controller 140) also writes the I/O request status to a status register 208. Although such status registers are typically used only in PIO mode, respective hardware standards allow the use of the status register in the DMA mode.

To use the status register 208 instead of the normal interrupt handling, the present invention implements a polling interface/protocol, whereby the hibernation engine 200 (via the system processor 120) initiates a DMA I/O operation, and then via the drivers periodically checks (polls) the contents of the status register 208 to obtain the status, that is, whether the I/O request is completed. Note that as used herein, the terms "intermittently," "regularly" "periodically" or the like with respect to the polling operation are equivalent, and only are intended to mean that the processor 120 is able to do other work in between asking for the status, rather than implying that any exact (or inexact) polling frequency is required.

In order to implement the polling protocol, the software drivers (DMA controller driver 210 and hard disk controller driver 212) export an additional function that returns the state of the hardware to the hibernation engine 200. The hardware states include ready, (i.e., for a next I/O operation, which indicates any previous I/O success), busy (currently executing the I/O request), or failed (was unable to execute the I/O request). When transferring data, the I/O status function should be called by the hibernation engine 200 frequently enough so that the disk is not unnecessarily idle, yet not so frequently that it interferes with the processor's ability to complete its parallel data compression or decompression tasks. To this end, a compression engine 214 is called with special callback function that is invoked sufficiently often to check the status of pending asynchronous I/O operation and start a new I/O operation when the previous operation is complete. Note, for example, that the frequency of calling for disk status may be tuned for typical systems, and/or may be self-adjusting to adapt to various hardware differences, e.g., call less often while awaiting completion of a write if the disk is usually busy yet compression could use more processing time. The drivers 210, 212 are provided with a function for notifying them when a pending I/O operation is completed, so that a driver may take any appropriate actions required to finalize the I/O, as if an interrupt occurred.

Figure 2:
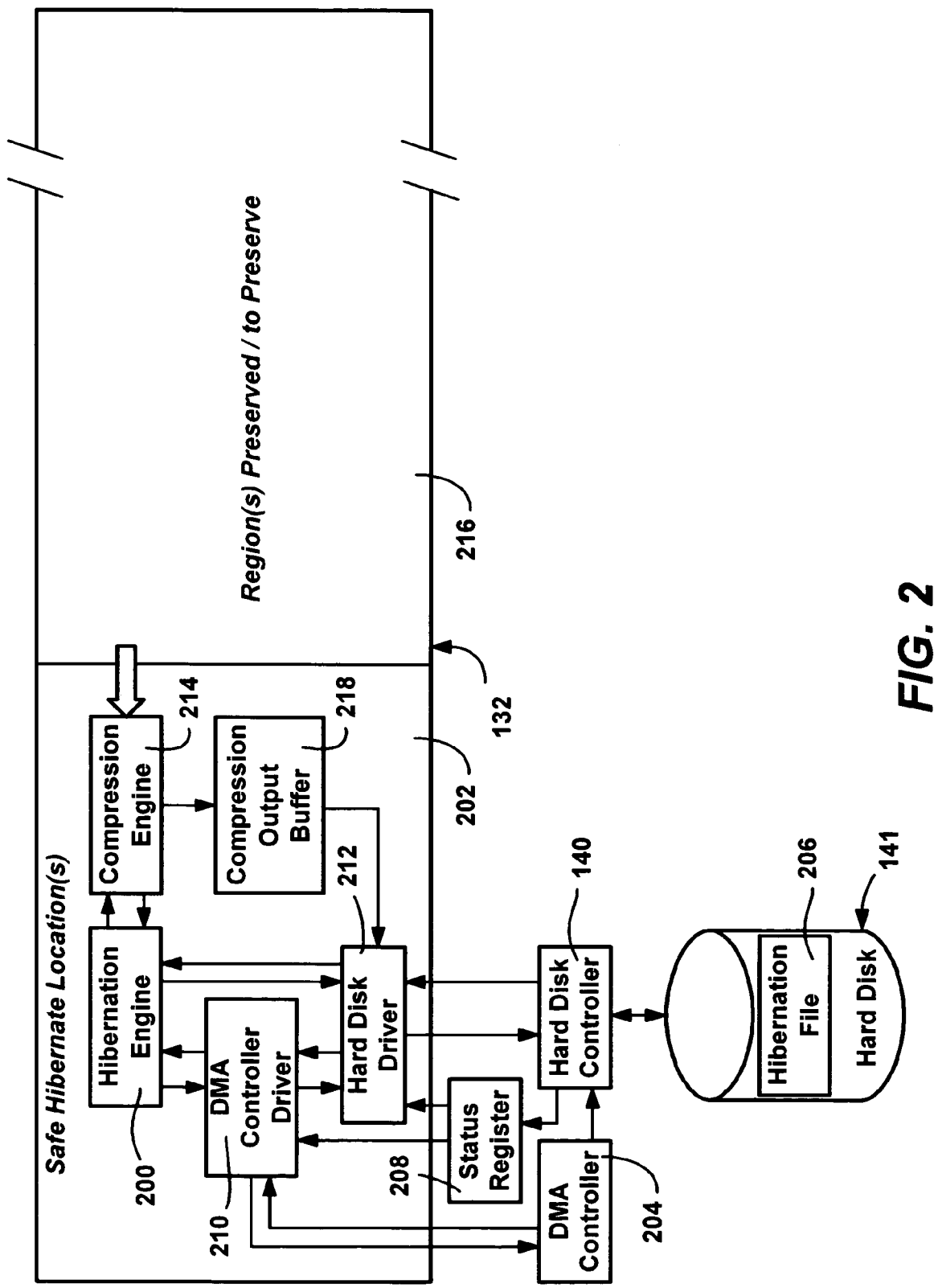
FIG. 2 is a block diagram generally representing exemplary components for preserving memory contents while entering hibernation in accordance with an aspect of the present invention.

In order to avoid modification of the memory region 216 that is to be written to disk by other means, the hard disk driver 212 and DMA driver 210 are controlled by the hibernation engine 200 to use only the safe hibernation locations of memory 202. The safe hibernation location 202 is specifically dedicated for use with the hibernation engine 200, and comprises discardable pages that are not preserved during hibernation with the other system memory, and therefore may be modified. Note that the safe hibernation location 202 need not be physically contiguous (as generally represented in FIG. 2), but can be allocated in a plurality of locations, including specific physical regions, to accommodate the drivers' or hardware devices' needs. Controlling the memory locations provided to the drivers 210, 212 and complying with other requirements as described below allows existing, slightly-modified drivers to be used, instead of one or more specially-developed drivers (which although feasible, is significantly more work than is needed). Similarly, it is feasible to use two or more processors and/or special hardware, and/or processors that support multiple threads of execution, to further increase the speed of entering (and resuming from) hibernation.

To obtain the requirements of the drivers 210, 212 and thereby control their memory usage, the hard disk driver 212 (e.g., ATAPI.SYS) and the DMA controller driver 210 (e.g., PCIIDEX.SYS) have been extended to include special interface functions that, when called by the hibernation engine 200, will return the requirements and details of the respective driver and hardware it controls. Note that other DMA drivers and hard disk controllers, e.g., SCSI-based, ATA100-based, or others can similarly provide limitations and details that will allow their memory usage to be controlled. One such detail that is returned is whether the hard disk supports DMA and whether DMA is enabled, which if not, will result in the PIO mode being used. Note that if the hard disk driver 212 or the DMA driver 210 do not export this new requirements-related function, or if the function returns with a result that DMA operation is not allowed/supported, the I/O will be performed in the old way, i.e., by the PIO mode with no attempt to do DMA. Similarly, if the kernel fails to allocate I/O buffers satisfying the requirements of the hard disk driver 212 and DMA driver 210 as described below, hibernation will be performed via PIO.

Other information returned by the drivers 210, 212 includes the amount of temporary memory required for storing any driver-specific data structures during operation. With this information, before beginning the data write operations, the hibernation engine 200 can request the operating system kernel to allocate an appropriate amount of memory for the respective drivers in the hibernation-safe area or areas 202. This ensures that the drivers 210, 212 will not need additional memory once the process of writing data for entering hibernation has begun, (because to freeze the non-hibernation memory contents for hibernation, allocation services and the like will not be allowed to operate). To this end, when hibernation is being started but before the data writing starts, the hibernation engine 200 first calls the drivers 210, 212 to find out how much memory they need, then has an appropriate amount of memory allocated therefor at safe hibernation locations 202, and gives each driver a respective pointer to its hibernation-safe memory location. When the drivers 210, 212 receive the respective pointers to the safe hibernation location or locations 202, the drivers 210, 212 initialize their internal data structures at those locations. By allocating sufficient memory based on their specified needs, the device drivers 210, 212 will have their data buffers stored in memory that is already allocated to them, so that no memory mapping/moving will be required when later I/O requests are processed. Note that it is relatively straightforward to extend the functionality of the drivers 210, 212 to comply with hibernation engine 200 requirements, because existing hard disk controller and DMA controller drivers do not use global variables for storing their internal data structures, but rather request and receive a pointer to memory for their own purposes. Consequently, the initialization phase is not different from a regular scenario, except for the initial providing of the drivers' requirements and the memory being allocated in the hibernation-safe memory location or locations 202.

In addition to memory size requirements, the extended driver functions also return the maximum size of allowed I/O requests, because hard disk and DMA controllers have a limit on a size of an I/O request that they may execute as a single atomic operation. Staying under the limit ensures that the drivers 210, 212 will not need kernel services (which will not be available) to handle larger I/O requests. Another detail returned is any maximum I/O buffer address, to handle some older hard disks and DMA controllers that cannot write to or read from memory above 16 MB, e.g., some types of physical memory require special mapping before DMA-based I/O operations in order to make such memory visible for the DMA controller. In addition, because most hard disks and DMA controllers require that an I/O memory block starts at an aligned (even) address, (e.g., 4 KB), alignment requirements of the I/O buffer are obtained. Similarly, because most hard disks and DMA controllers require some even I/O request size, this information is also returned. Still further, because most DMA controllers do not allow I/O memory blocks to cross a 64KB boundary, any such limitations of the I/O buffer layouts are obtained, whereby the hibernation engine 200 can arrange a compression (output) buffer 218 that meets the drivers' requirements.

With the information from the drivers, the hibernation engine 200 can match the requirements and limitations of the hard disk controller 140 and DMA controller 204 so that DMA hibernation is possible without requiring complex kernel services during the I/O. In other words, as long as the drivers' allocated data locations are appropriately sized in a safe memory range, along with a properly aligned output buffer 218, and that the hibernation engine 200 splits any large I/O requests into sequence of smaller ones that otherwise match the hardware limitations, DMA requests will not cause any additional operations with the I/O buffer or I/O request that may violate the memory-related rules of hibernation. Note that instead of using generic memory, the DMA-based I/O functions use the hibernation-safe memory location supplied via the pointer from the calling hibernation engine 200. Since there is no need for the use of complex kernel services for dequeuing pending I/O requests, no dequeuing is performed.

The hibernation engine starts the I/O operation by calling the DMA driver 210, which in turn instructs the DMA controller 204 to start writing to the hard disk controller 140, and instructs the hard disk controller 140 to write a data sequence from the DMA controller 204 to a specific location on the hard disk 141. The driver works by getting a new I/O (IO_START) request, including parameters for the new I/O request, including the size of the requested I/O operation, the target location on the hard disk, the address of the beginning of the I/O memory block, along with an address in the hibernation-safe memory region 202 for internal driver purposes. For safety reasons, the driver function verifies that each I/O request is compliant with the requirements imposed by the hardware it handles. If compliant, the function passes the request directly to lower-level routines without any transformations. If a request does not comply, the request is rejected and the driver returns STATUS_INVALID_I/O_REQUEST.

When the I/O request is completed or an error is detected, any operations on the DMA and hard disk controllers are stopped, and either a STATUS_OK or STATUS_ERROR are returned by the driver 210, respectively. When processing requests, DMA-hibernation functions avoid using any system services or functions that send requests directly to respective hardware. If the I/O operation is not completed instantly and waiting is required, the driver 210 saves its state in its hibernation-safe memory location, and returns a STATUS_PENDING code to signal that I/O needs to be resumed later.

In other words, because the interrupts are disabled, instead of returning control back to the system when waiting is required, and proceeding further when an acknowledgment interrupt is received, each time the polling function has to wait, it remembers its state (into a hibernation-safe memory location) and the drivers 210, 212 return control to the hibernation engine 200 with a status equal to STATUS_PENDING. A driver assumes that the caller will need to call this polling function again at a later time in order to check on the pending I/O.

More particularly, as described above, instead of using interrupts to detect the end of the next stage of an I/O operation, the driver functions use a respective device status register 208. When the status register 208 has a BUSY bit turned on, i.e., the device is still executing a request, and an ERROR bit turned off, i.e., there are no hardware errors, the driver 210 remembers its state in a hibernation-safe memory location supplied by the hibernation engine 200, and returns a STATUS_PENDING. If an ERROR bit is turned on, it means that the requested I/O operation failed, and the driver 210 returns STATUS_ERROR. The interface function should be called with an IO_RESUME instead of IO_START the next time, until the previous I/O operation completes. Otherwise, this stage of I/O completed successfully, whereby the driver 210 returns a STATUS_OK code so that caller may initiate a new I/O.

Figure 3:
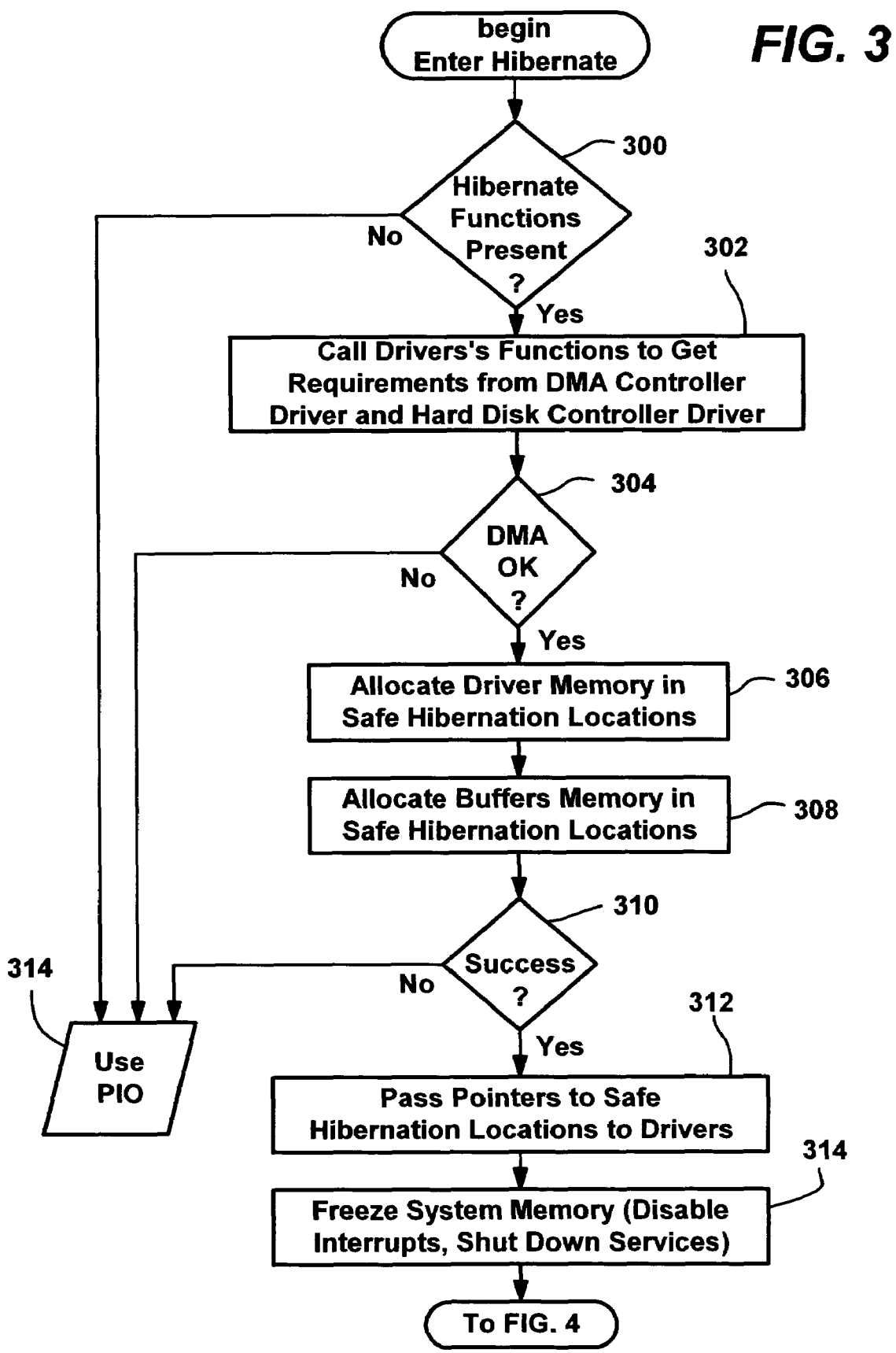
FIGS. 3, 4A and 4B comprise a flow diagram generally representing steps taken to enter into hibernation in accordance with an aspect of the present invention.
Figure 4A:
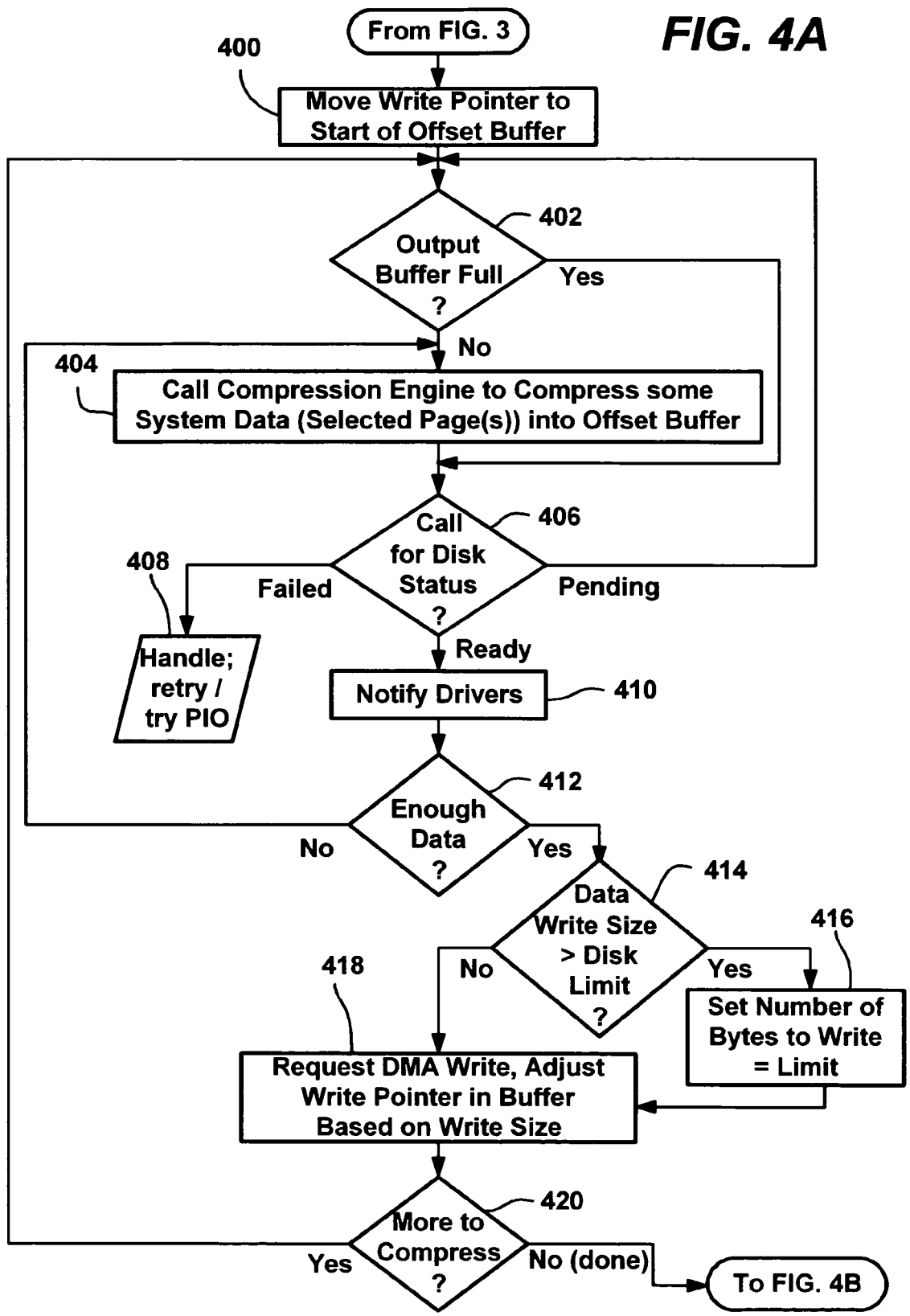
Figure 4B:
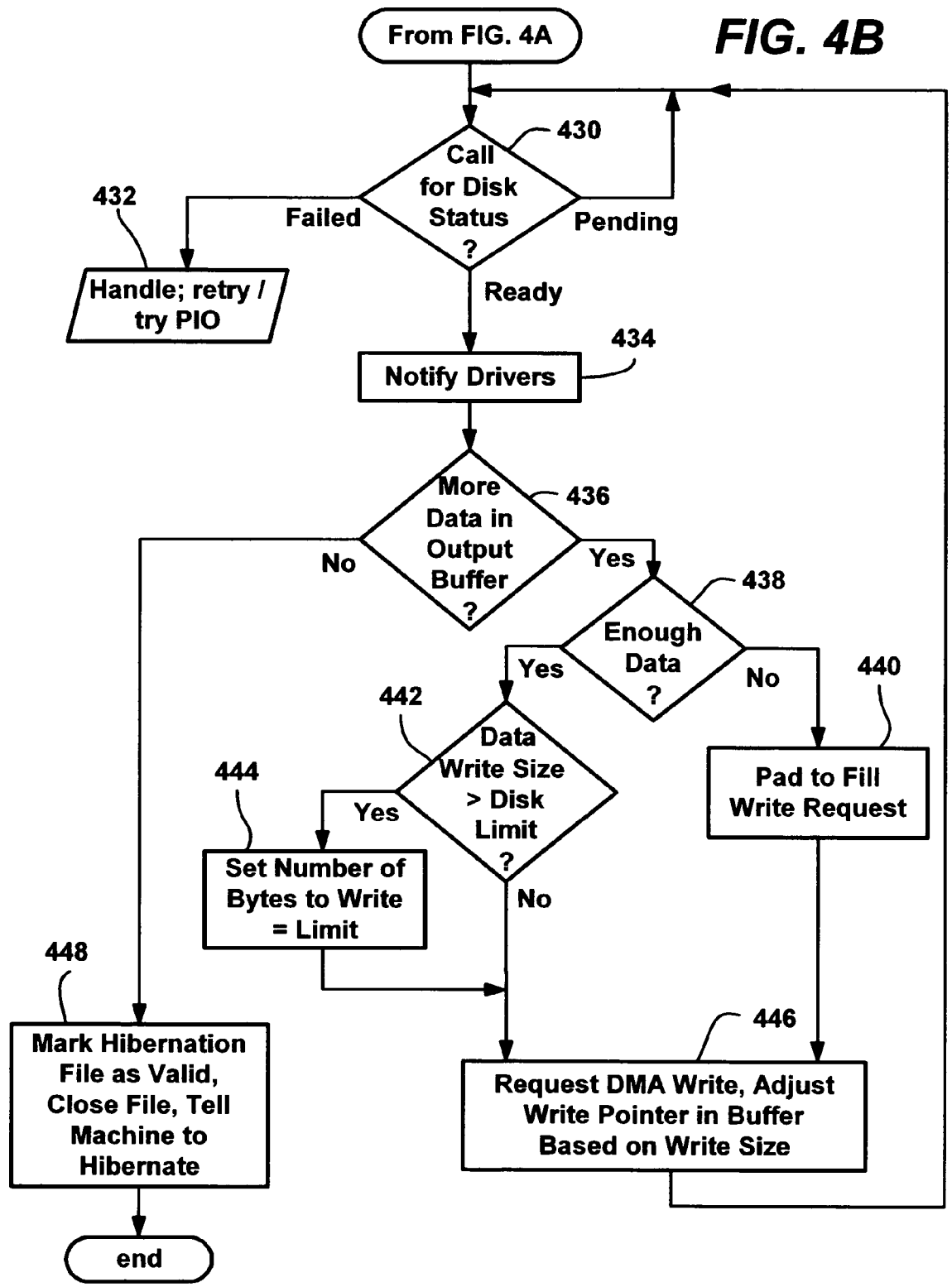

Turning to an explanation of the invention with respect to entering into hibernation, the flow diagrams of FIGS. 3 and 4A-4b generally represent the steps taken by the hibernation engine 200. Beginning at step 300, the hibernation engine 200 tests whether the hibernation-related functions are present in the hard disk controller driver and DMA driver. If not, step 300 branches to step 314 where the known PIO mode of entering hibernation is attempted. If at step 300 the hibernate functions are present, step 300 branches to step 302, wherein the hibernation engine 200 calls the drivers' respective functions to obtain the requirements and limitations of the drivers and their respective hardware devices as discussed above.

Step 304 then evaluates the returned information to test whether DMA is supported by the particular hardware. If not, step 304 branches to step 314 where the known PIO mode of entering hibernation is instead attempted. Alternatively, if DMA is supported, step 304 branches to step 306 wherein the hibernation engine 200 calls the kernel services (note that they are still active at this time) to allocate memory for the drivers in the safe hibernation location in accordance with their requirements. Step 308 represents the requested allocation of memory for the compression buffer 218, including any alignment or special physical locations as specified by the drivers.

Step 310 represents a test of whether the allocation requests were successful. Note that in actuality, each separate allocation request has a returned status that may indicate an error, however for simplicity these are collectively shown by decision diamond 310. If there is an error (e.g., insufficient memory), step 310 branches to step 314 where the known PIO mode of entering hibernation is instead performed.

If the memory was successfully allocated, step 312 represents the passing of the pointers to the safe memory locations by the hibernation engine 200 to the drivers. Note that this can alternatively be provided later, such as in conjunction with the write request. Step 314 represents the protecting of the memory regions that are to be preserved, by disabling interrupts and shutting down the system services. System services can be effectively shut down by gaining exclusive control of the processor or processors and thereafter not relinquishing control until after hibernation resume operations (described below) are complete. The process continues to step 400 of FIG. 4A to begin compressing and writing the compressed data to the hard disk 141.

Step 400 represents the initializing of the buffer 218 in which compressed data will be placed prior to writing it, and step 402 tests whether the buffer is full, as discussed below, which initially is not the case. To compress the data, the compression engine 214 is called at step 404, with parameters providing the compression engine 214 with a pointer to the output buffer 218 and the starting location (e.g., selected page) of the system memory 216 to be preserved. Note that compression of the data is not necessary for hibernation, however compression significantly reduces data transfer times.

It should be noted that not all of the remaining (non-hibernation engine) memory necessarily needs to be compressed/saved during hibernation, only those pages that are not marked as invalid or discardable. For example, in contemporary operating systems, memory pages may be deallocated, copied to disk for swapping purposes, and so forth, and thus there is no reason to preserve such unneeded or already-preserved pages. Rather than compress and preserve such pages, the hibernation engine starts with a list of non-discardable physical (e.g., 4 KB) memory pages that should be saved, and (instead of advancing input pointer that points to memory), advances in the list of "pages-to-write" until the end of list is reached. Similarly, only those pages need to be restored. Thus, the system memory regions to preserve 216 may be considered only such selected pages.

To perform the data compression, any data compression engine is suitable, such as an LZ77-based compression engine that provides an acceptable compression ratio and compression speed. LZ77 compression is a well-known data compression technique which generally operates by looking for matching bit or byte patterns in previous locations within a size-limited window, (e.g., 64 KB), and then replacing the matching pattern with a length, offset pairing that identifies the pattern. If no sufficient matching pattern is found, the pattern itself (one or more literals) is stored in the output compression buffer 218. In general, the larger the window the better the compression ratio, but the longer it takes to search for matching symbol strings.

The compression engine 218 can be provided with data to compress and polled for completion, however it is also straightforward to arrange a compression engine 218 with a callback mechanism to call a function of the hibernation engine 200 after some number of bytes are compressed, where the number may be specified by a parameter provided by the calling hibernation engine 200. In this manner, when compressing data, the pending I/O status can be regularly checked at a frequency controlled (primarily) by the hibernation engine 200. Step 404 represents the call by the hibernation engine 200 to the compression engine 214, which compresses the data into the output compression buffer 218. With the call, the compression engine 214 is passed a pointer to call back the hibernation engine 200, so that when the amount of data is compressed the drivers can be again polled until the last pending I/O completes.

Following the call back from the compression engine 214, step 406 represents the checking of the disk status, which initially should be ready. If ready, step 410 is executed to notify the drivers 210, 212 of any completed I/O, as needed. Step 412 checks whether there is enough compressed data to perform the write, e.g., based on hardware requirements and/or otherwise for efficiency, such as to write larger blocks per request rather than several smaller ones. If there is not enough data, the process loops back to step 404 to call back the compression engine 214 to compress more data. Note that with appropriate buffer sizes, it is not possible to have a situation wherein the buffer 218 is full yet there is not enough data to write.

When there is enough data to perform a write as determined via step 412, step 414 then tests whether the data ready in the output buffer 218 exceeds the amount that the hardware can handle, which as discussed above was provided to the hibernation engine 200 via the calls to the drivers. If so, step 414 branches to step 416 to set the write request to the hardware limit, and thereby essentially segment this request so that the hardware drivers do not need the complex kernel services (now unavailable) to handle the request. Step 418 represents the DMA write request to the DMA controller driver 210. Note that a circular output buffer that is properly aligned and has a size that is a multiple of the minimum may be used, (e.g., the maximum I/O request size is typically 4 KB, with a non-crossable boundary, typically equal to 64 KB). Disk writes are in sizes that are a multiple of the minimum I/O request size (typically 512 bytes), but do not exceed the maximum I/O request size, and the I/O request address range does not cross a boundary. This takes advantage of the fact that the maximum I/O request size (equal to 4 KB for conventional CPUs) is a multiple of the minimum I/O request size (equal to 512 bytes sector size on most hard disks), which, in turn, is multiple of buffer address alignment (two bytes for PIIX DMA controller), which is a multiple of request size alignment (two bytes for PIIX DMA and IDE hard disks). The circular buffer comprises three possibly empty parts that are circularly contiguous, namely compressed data ready to write, unused, and compressed data being written.

In keeping with one aspect of the present invention, while waiting for the write to complete, if there is more data to compress, step 420 loops back to step 402 to enable parallel data compression, provided that there is room in the output buffer 218 for the compressed data at step 402. Note that because the hibernation engine 200 controls the output buffer location into which the compression engine 214 will compress the source data, and the amount of data to compress, the hibernation engine 200 ensures that any already-compressed data will not be overwritten in the compression output buffer 218 until it has been successfully written to disk. The hibernation engine 200 may thus wait as necessary for the next write to complete to free up enough space in the buffer 218. The hibernation engine 200 can assume a worst-case data compression scenario (e.g., that actually expands rather than compresses the data) when evaluating whether there is room in the output buffer 218.

Once a DMA write is started via step 418, step 406 represents the subsequent polling calls by the hibernation engine 200 to have the driver check the status register 208, as described above. While the write request is pending, step 406 loops back to step 402 to enable further data compression to occur in parallel with the write, until the status changes to ready or failed. If the DMA I/O write operation fails, (the driver returned STATUS-ERROR), at step 408 the hibernation engine 200 may retry the request some number of times, (e.g., once more), and if still failing will try to switch to PIO mode and continue operation in PIO mode. If the PIO-mode I/O also fails, this is considered an unrecoverable error, whereby the system will not enter hibernation, but instead will shut down and next time attempt to return in a full power-on mode. If at step 406 the write was successful, i.e., the status is ready, the hibernation engine 200 notifies the drivers 210, 212 at step 410, and proceeds via steps 414-420 to repeat the process and start the next write.

Eventually, there will be no more data in the memory locations 216 to compress at step 420, and the process will continue to step 430 of FIG. 4B, which represents polling the status for the previous write request to complete, again handling any failure via step 432. If the disk status is ready, step 434 calls the drivers 210, 212 to notify them of the success. Step 436 then tests whether there is more data in the compression output buffer 218 to write. If not, the memory contents have been saved to the hibernation file 206 and the process continues to step 448, described below. If there is more data in the output buffer 218 to write, step 438 tests whether there is enough to write, and if not, branches to step 440 to fill an otherwise inadequate write request with blank data or the like if needed to meet a hardware minimum.

If there is enough data to write, step 438 branches to step 442 to test the amount of data that can be written against the hardware limit. If too large, step 442 branches to step 444 to set the write request to the hardware limit, and thereby essentially segment this request. Step 446 represents the DMA write request to the DMA controller driver 210. Following the write request, the process returns to step 430 to await the write status as described above.

When all data has been compressed (step 420) and there is no more data in the output buffer to write (step 436), step 448 is executed. Step 448 represents the marking of the hibernation file 206 as valid (tested upon resume, as described below), the closing of the hibernation file 206, and the outputting of the instructions (e.g., to various registers) that put the machine hardware into the proper mode so as to awake when one or more various criteria are satisfied. In the above manner, hibernation can be rapidly achieved via parallel data compression and DMA disk writing.

Resuming from hibernation, such as when the user presses a power button, can proceed as before, e.g., via PIO. However, the present invention also provides two significant improvements to the resume from hibernation operation, which can be combined or used separately to resume much faster than with conventional PIO and decompression models. A first improvement, described below, deals with the use of DMA to read the hibernation file 206 and thereby allow parallel decompression to occur. A second improvement, also described below, provides a significantly faster decompression process than those previously used.

Figure 5:
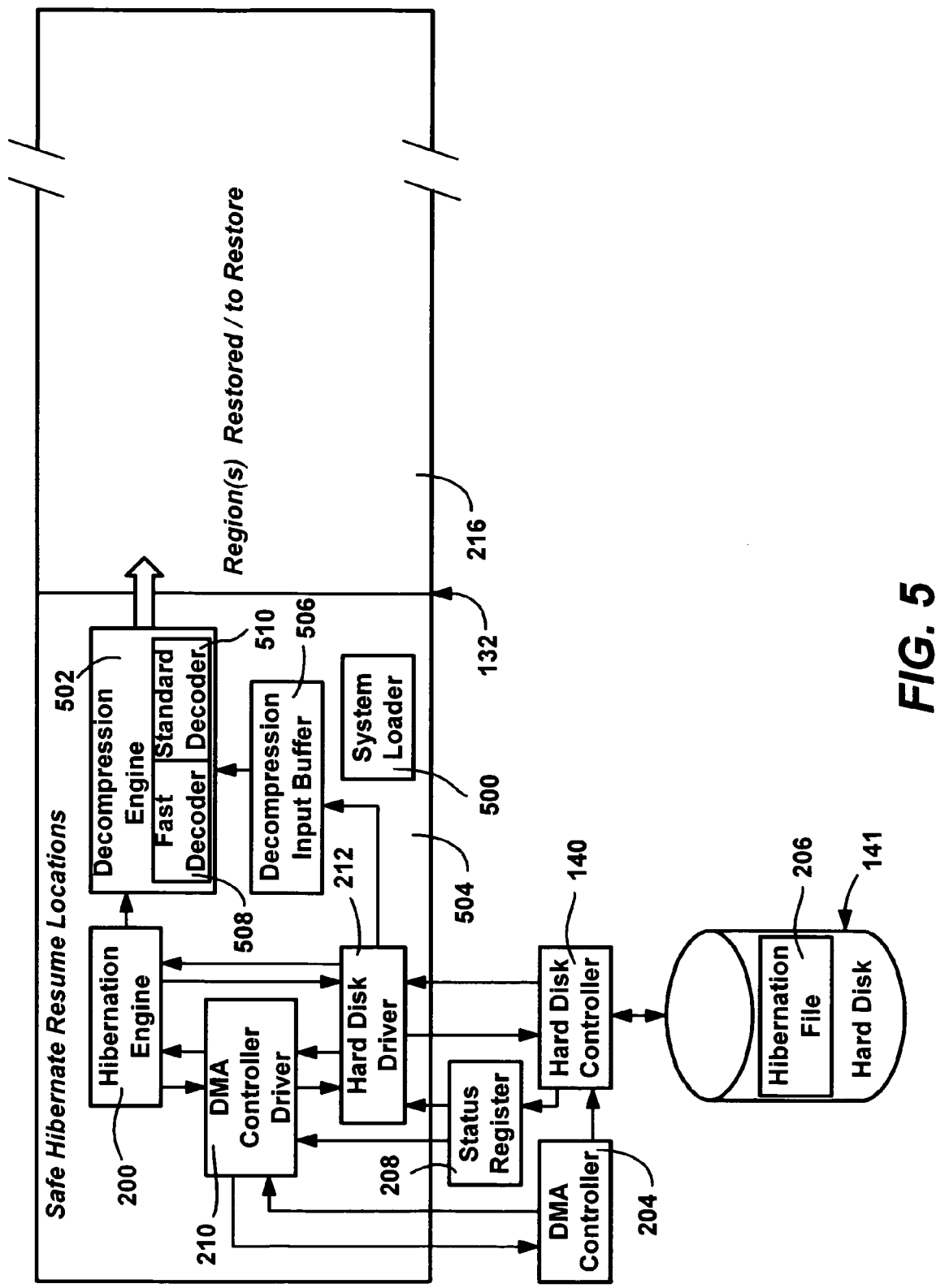
FIG. 5 is a block diagram generally representing exemplary components for restoring memory contents while resuming from hibernation in accordance with an aspect of the present invention.
Figure 6:
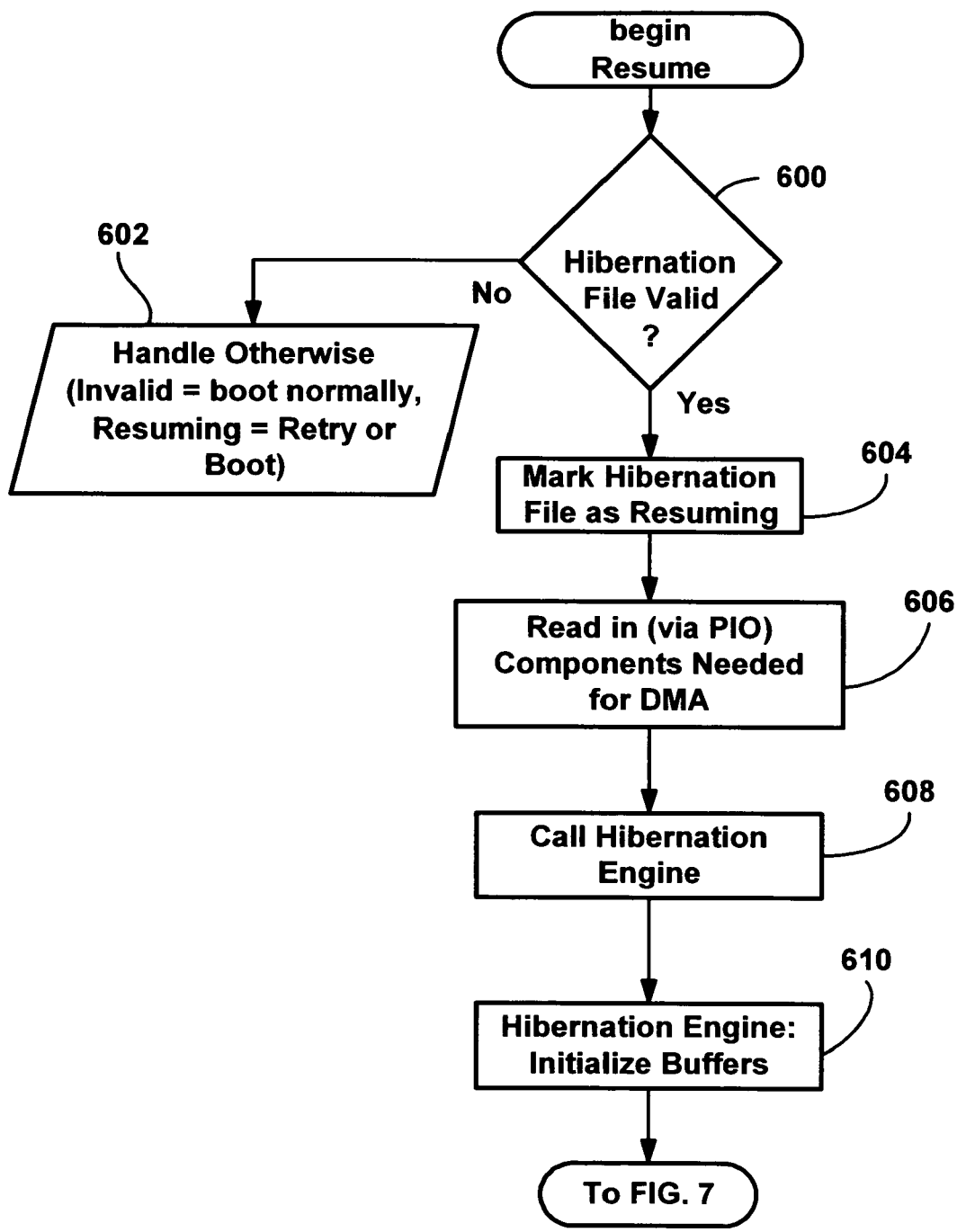
FIGS. 6 and 7 comprise a flow diagram representing general steps taken to resume from hibernation in accordance with an aspect of the present invention.
Figure 7:
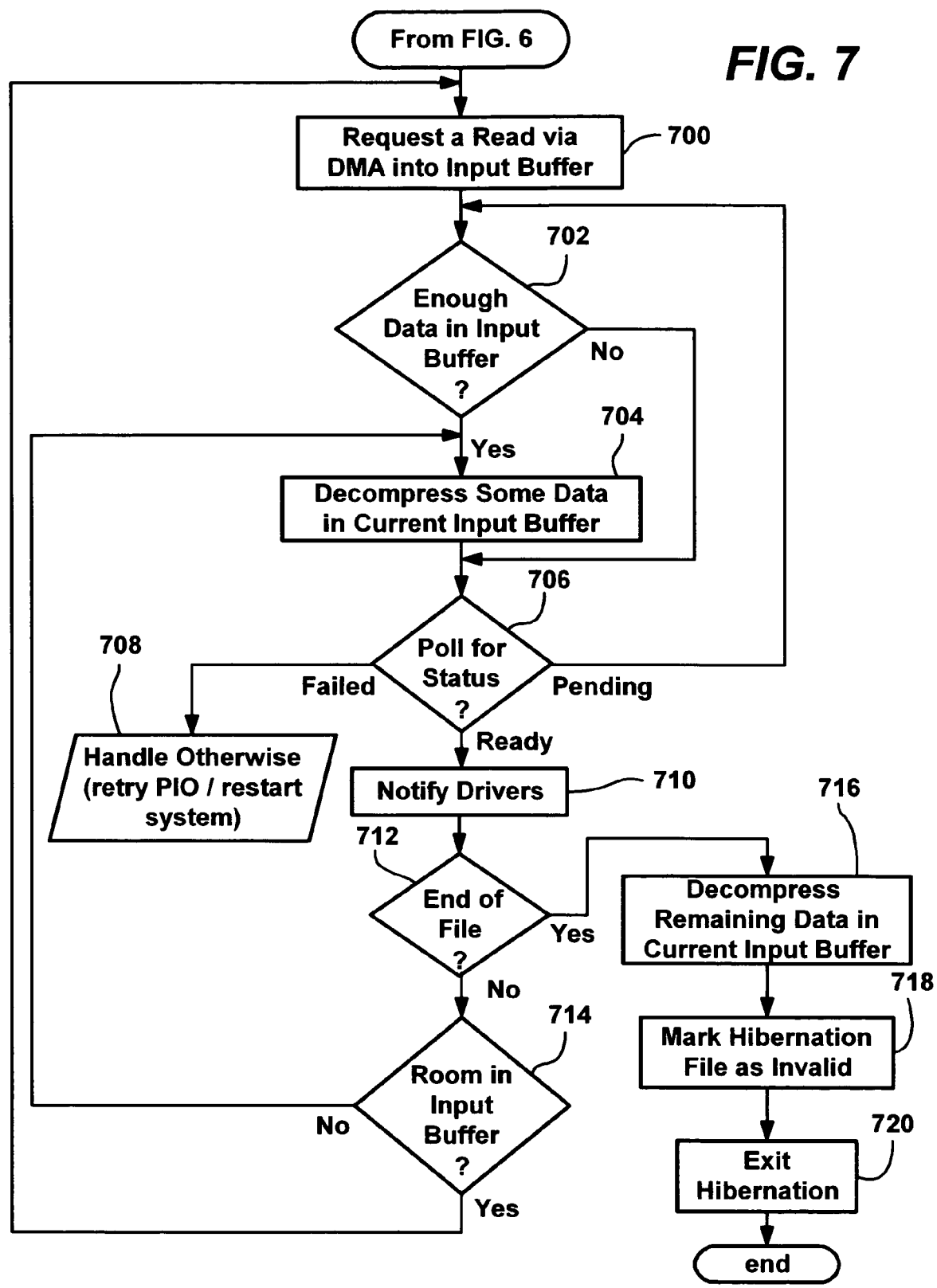

FIG. 5 and the flow diagrams of FIGS. 6 and 7 represent the resume components and process when performed with DMA. To implement DMA resume, a system loader process 500 has been modified to check the hibernation file 206, and if marked valid, read in (e.g., via PIO) the components needed to perform DMA, e.g., the hibernation engine 200 (or a resume equivalent) along with the DMA controller driver 210 and hard disk driver 212. Note that PIO reading (no DMA) is presently (and exclusively) performed during resume from hibernation, and thus will not be described in detail herein.

In general, upon startup, the initial system loader 500 first checks the status of the hibernation file 206 as represented in FIG. 6 via step 600. If not valid, via step 602 the system will boot normally, e.g., without attempting to restore any hibernated state, since this normally means that the user did not enter into hibernation when the machine was powered down. Another possibility is that the hibernation file 206 is marked as being in a "Resuming" state. As described below, this means that the hibernation resume was attempted, but failed for some reason. This is accomplished when step 600 determines that the hibernation file 206 is valid, and step 604 marks the file as "Resuming," (e.g., via a PIO write), whereby if the resume process fails during memory restoration the user will be prompted to retry the resume or direct the machine to boot normally. This gives the user control rather than forever attempting to resume from a failed hibernation. Note that later, if the resume operation was successful, the hibernation file 206 will be marked as invalid.

Step 606 represents the reading in of the hibernation engine 200, a decompression engine 502, and the drivers that enable DMA. The system loader can read this into a hibernation resume safe memory region 504, or once loaded the hibernation engine 200 can move itself and the other components around as needed. Once loading is complete, the system loader 500 then calls the hibernation engine 200 as represented by step 608. Note that the system loader 500 (or the hibernation engine 200) can load the decompression engine 502 based on the type of compression that was used, if known in advance or is otherwise determinable, (e.g., via metadata associated with the hibernation file 206). For example, as compression technology has evolved, different decompression engines are needed, and the present invention can selectively load a matching one so that new technologies can be used, yet backward compatibility is retained.

At step 610, the hibernation engine 200 initializes one or more decompression input buffers 506 to prepare for reading and decompressing of the hibernation file 206. The hibernation engine 200 then proceeds to step 700 of FIG. 7 to call the DMA controller driver 210 to read in the data for decompression and restoration thereof via DMA read request, passing a pointer to the input buffer 506. The hibernation engine 200 uses a logically circular input buffer 506 or the like that is sufficiently large with respect to the original compression window so that a read can occur into one location while another location is being decompressed without the possibility that data (a pattern) that is needed for decompression will be overwritten by the next read. In this manner, the buffer can be safely filled in one buffer location while the data in another buffer location is being decompressed. Further, note that the read size may be adjusted for segmenting if a logically circular buffer is being used so as to not read beyond the physical end of the buffer.

Step 702 checks whether the buffer 506 is ready with a sufficient amount of data to start decompression, because, for example, there may not be any data in it, or because the reads may have to be segmented to match hardware limitations, and it may be more efficient to decompress data in large amounts per call rather than regularly call the decompression engine with only small amounts. If more data is needed, step 702 bypasses calling the decompression engine, otherwise step 704 is executed to call the decompression engine 502 to decompress some amount of data. The decompression engine 502 may be similar to the compression engine as described above with respect to its called functions, e.g., passed a pointer to the appropriate location in the input buffer 506, an amount (e.g., number of compressed bytes) to decompress, and a callback pointer for calling the hibernation engine 200 when finished. The decompression engine 502 is given a pointer to an output buffer, which may be a temporary restore buffer or directly at a location (e.g., in a selected page) in the system memory 216 that is being restored.

Step 706 represents the polling for the DMA status, (similar to that described above with respect to the write request), with step 708 representing the handling of the failure case. If a failure occurred, one or more DMA or PIO retries may be made, which if also unsuccessful will cause a restart of the system, this time with the hibernation file 206 marked as "Resuming" status. If the status is pending (busy), the process branches back to step 702 to attempt to decompress more data. If ready, the process continues to step 710 to notify the drivers.

Step 712 tests for whether the hibernation file 206 has been fully read into the input buffer 506. If not, step 712 branches to step 714 to determine whether there is adequate room in the input buffer 506 for further data to be read. If there is not enough room, step 714 branches to step 704 to decompress some more data. If there is room, step 714 returns to step 700 to read in another amount. Note that in addition to detecting the end of the file 206, the system loader/hibernation engine 200 can also detect out of memory situations, such as when memory was physically removed since hibernation was entered or the hibernation file 206 "appears" on a different machine (because the hard drive was transferred) without sufficient memory. For example, in situations when it turns out that there is more data to decompress than memory for outputting it, the hibernation file 206 can be marked invalid and the system restarted.

If at step 712 the hibernation file 206 has been completely read in, steps 716, 718 and 720 are executed to complete the resume from hibernation process, including decompressing the remaining data in the input buffer 506, marking the hibernation file 206 as invalid (so that it will not be used again unless hibernation is explicitly re-entered), and to exit hibernation. Exiting hibernation essentially comprises deallocating as much of the hibernation resume safe memory 504 as possible and relinquishing control at the hibernation engine 200 to the processes that were executing when hibernation was entered. At this time, the system memory 216 (e.g., each of the selected pages) is restored. Also, the state of devices, services and so forth are restored, and the computer operates as it was before hibernation was entered.

In accordance with another aspect of the present invention, a significantly faster LZ77 decompression decoder is provided that can be used with data decompression generally, including when resuming from hibernation (whether PIO resume or DMA-based resume). In general, the faster decoder operates by reducing the number of bounds checks on the buffers without allowing the output buffer to overflow.

It was previously believed that to decompress LZ77-encoded data, regular bounds checks are necessary to deal with data that may possibly be corrupted. More particularly, a reliable decompression decoder needs to handle not only valid and correctly encoded data, but also corrupted data. If encoded data is corrupted, a reliable decoder either detects or reports an error, or, if an error cannot be detected easily, continues execution without crashing or causing system instability. Note that the use of checksums and the like detect data corruption only probabilistically, and thus are not guaranteed to be perfect, as there is always a chance that a checksum will miss data corruption.

To be reliable, an LZ77 decoder has to ensure that the input buffer has enough data, that each substring referenced by a pointer in LZ77 code actually exists, and that the output buffer has enough space to hold decoded symbols. If any of these rules are not enforced, corrupted data may cause the decoder to access memory outside of its input/output buffers, causing a memory protection fault or overwriting other key data, thus crashing or destabilizing the system. Much of the processor time used by known decoders is spent checking the bounds to ensure that decoding operations stay within the buffers.

FIGS. 8-11 are flow diagrams that explain how the fast decoder (e.g., 508) of the present invention substantially increases the decompression speed by reducing the number of bounds checks for the majority of the data to be decompressed, yet does so safely. The remaining data that cannot be safely decompressed with the fast decoder 508 is decompressed with a standard decoder 510. Note that both the standard decoder 510 and fast decoder 508 are relatively small, and thus it is not a significant burden on a contemporary system to have two types of decoders loaded into memory at the same time. Since the standard decoder 510 is used when the fast decoder 508 approaches the end of the buffer, the fast and standard decoders can be considered a two-phase decoder, and can be incorporated into the decompression engine 502 of FIG. 5.

The first phase (fast) decoder 508 benefits from common statistical properties of typical encoded data (texts, documents, executable programs, object files, libraries, HTML/XML pages, database files, and so forth) in order to considerably reduce amount of bounds checks needed on average. One feature that the present invention leverages is that in typical data, most matching substrings are relatively short. Indeed, in typical encoded data, approximately ninety-five percent of matching substrings do not exceed eight symbols in length, while the average length of a matching substring is approximately five symbols.

In general, the fast decoder 508 of the present invention more efficiently handles the decoding of these short substrings and literal symbols by eliminating the output buffer bounds checks for them and replacing the conventional symbol-by-symbol copying (that checks for the end of the substring after each copied symbol) with a technique that unconditionally copies a fixed amount of symbols. To do this safely, the fast decoder 508 guarantees that the output buffer will have enough space left to hold short substrings and literal symbols. When the buffer is almost full and this guarantee is not possible, the decompression process switches to the second decoding phase that finishes the decoding using a standard decoder 510.

Figure 8:
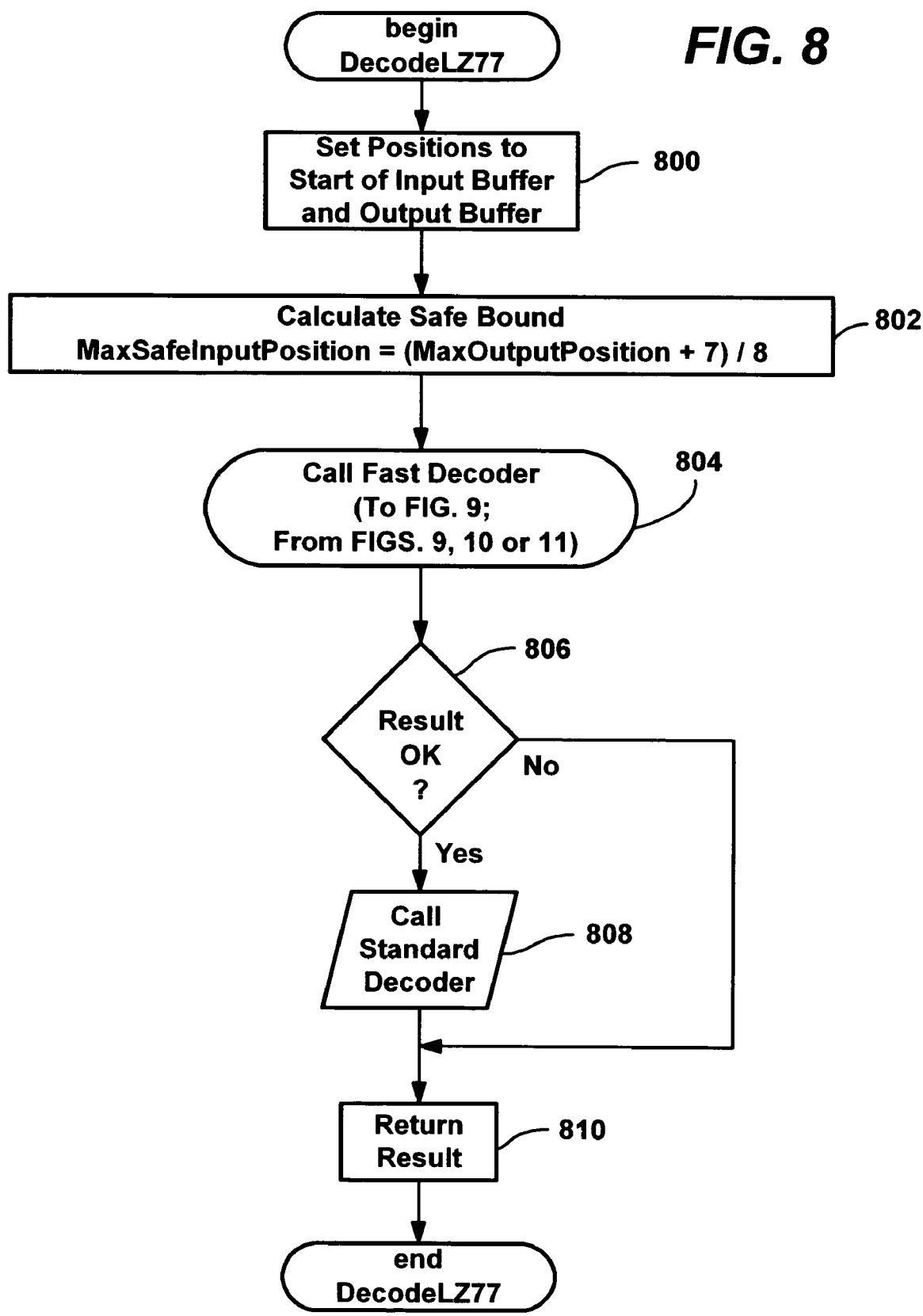
FIG. 8 is a flow diagram generally representing a general two-phase decoding procedure for restoring compressed data to an uncompressed state in memory in accordance with an aspect of the present invention.

During the first phase of decompression, the fast decoder 508 guarantees that it has enough space in the output buffer for some number N of symbols, chosen herein to be space for eight (8) more symbols. The choice of the actual value may vary depending on a particular implementation and hardware. FIG. 8 shows a general process that sets up and then calls the fast decoder 508 in a first phase, and the standard decoder 510 in a second phase, to decode some amount of data. Step 800 represents the initialization of the input and output buffers. A safe bound, maximum safe input position is calculated to be the maximum output position+7)/8, where the values match the N=8 value chosen above. Step 804 then calls the fast decoder, beginning at step 900 of FIG. 9.

The guarantee is accomplished by periodically adjusting an input buffer bound limit. To do this, the input buffer bound is set to minimum of the input or output buffer size divided by N, wherein in the present example N=8. When the decompression engine reaches this limit, or needs to decode a substring of more than N (=8) symbols, it readjusts the limit by increasing the limit by the minimum of the remaining part of the input or output buffer divided by N. If the input buffer is fully exhausted or the output buffer does not have space for at least N (=8) more symbols, the first phase finishes. If the result was OK (e.g., the data was not corrupted as described below), the remaining (N−1) or less symbols are decoded by the second phase, the standard decoder 510. This is represented in FIG. 8 by steps 806-810.

Figure 9:
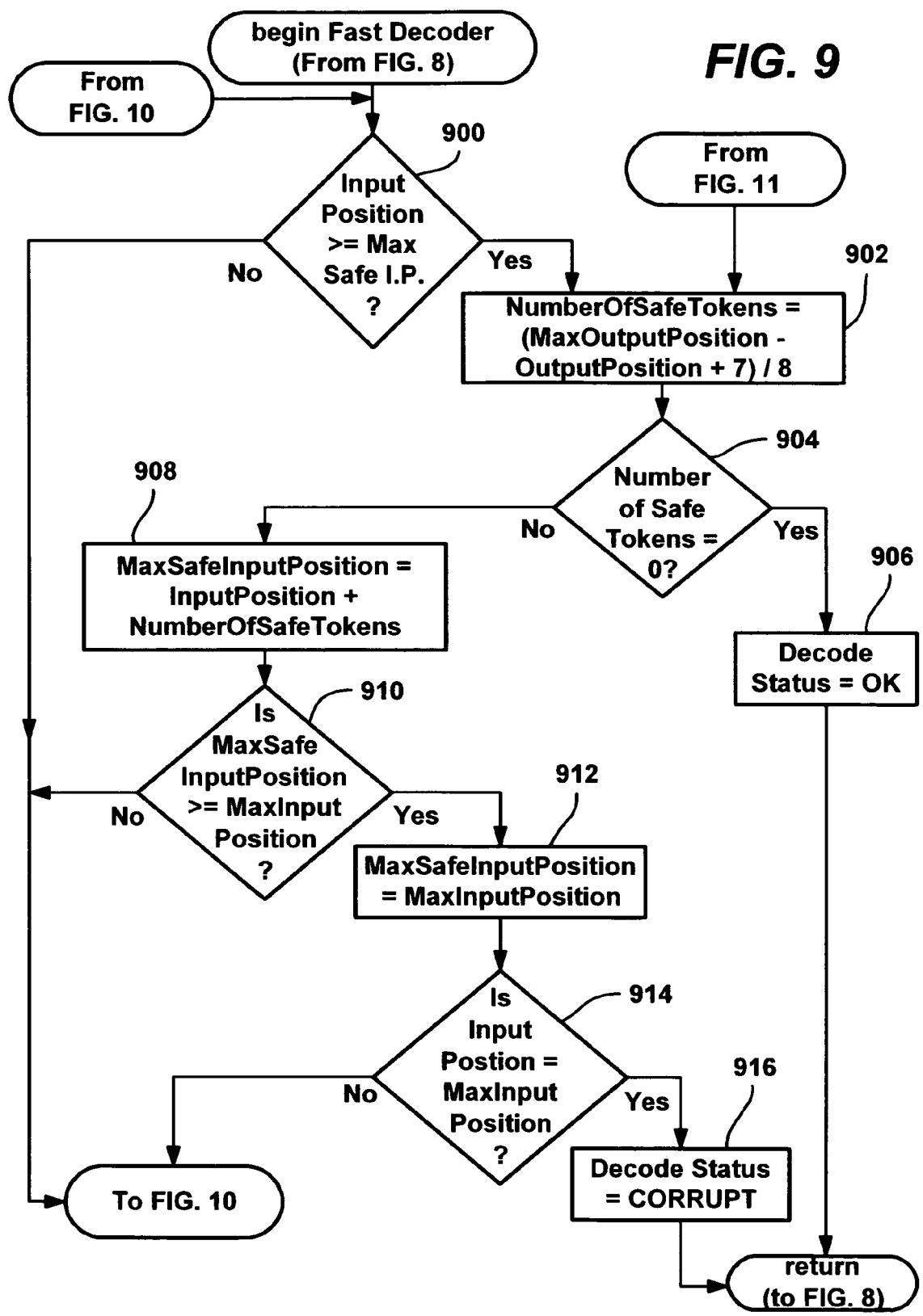
FIGS. 9-11 comprise a flow diagram representing a fast decompression process in accordance with an aspect of the present invention.
Figure 10:
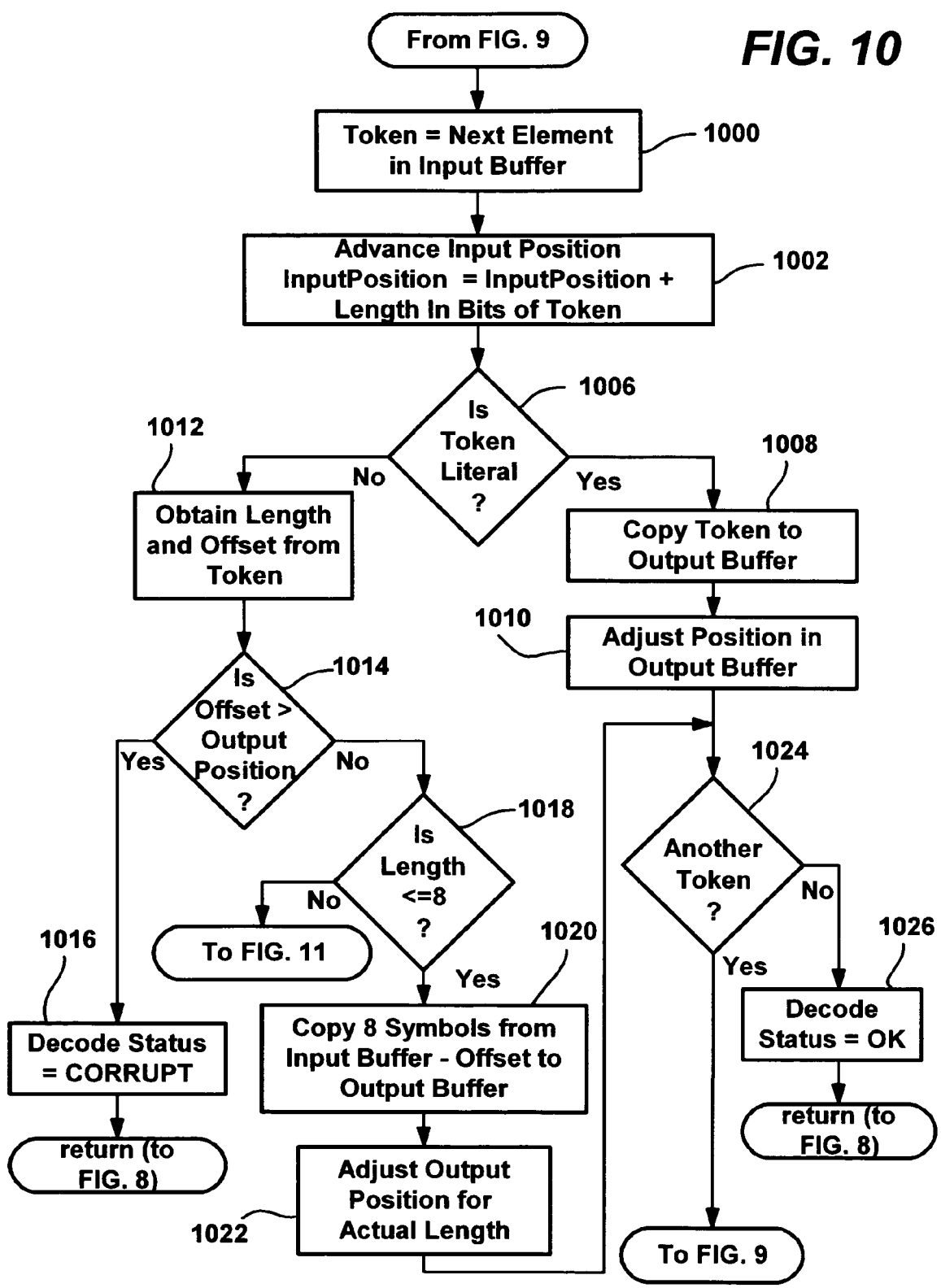
Figure 11:
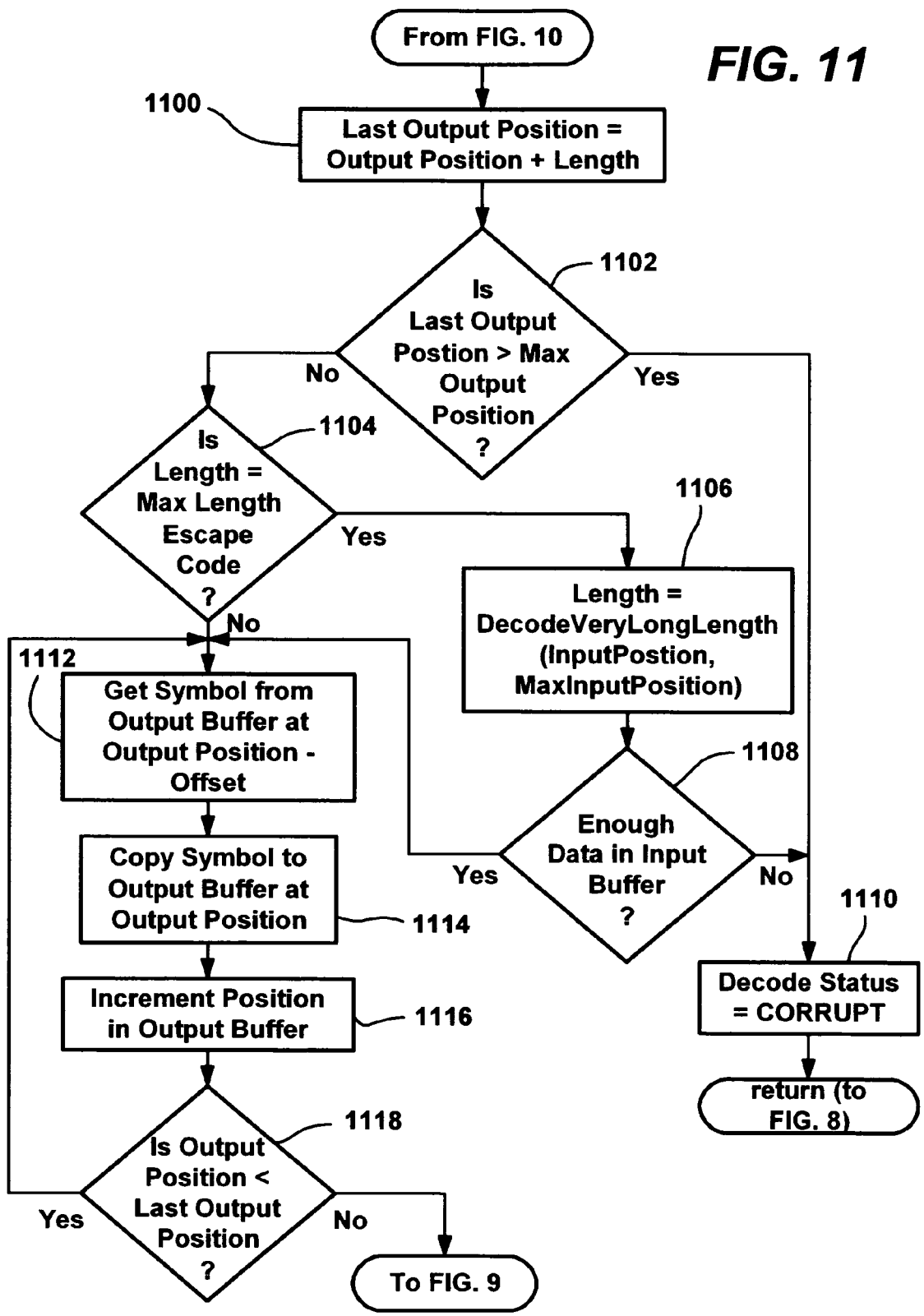

FIGS. 9-11 shows the process of the fast decoder 508, beginning at step 900 wherein a safety check is made that the actual input position is not greater than or equal to the maximum safe value (first calculated at step 802). At this time, the input position is zero, so step 900 branches to step 1000 of FIG. 10.

Step 1000 of FIG. 10 selects as a token the next element (a literal symbol or length, offset pairing) from the input buffer (e.g., 506), and then at step 1002 moves the input position based on the size of the token. Step 1006 checks whether the token is a literal symbol. If so, the token is copied to the output buffer at step 1008, without any bounds check. Note that during the first phase of decoding, it is guaranteed that the output buffer always has enough space to store at least N more symbols. This is done without increasing the number of comparisons, because before decoding, the next token decoding operation ensures that the input buffer limit is not crossed. As a result, the first phase decoder 508 need not check the output buffer bound each time a literal symbol is decoded, because it knows that output buffer has enough space to store one more symbol (actually N more symbols) since it is guaranteed by the fact that the input position is less than the maximum safe value. Step 1010 adjusts the position in output buffer to prepare for the next symbol.

If at step 1006 the token was not a literal, step 1006 branches to step 1012 to obtain the length and offset values from the token. Step 1014 is a check that ensures that the offset is not greater than the output position. Note that in LZ77 compression, any given offset should point to a previous location in the already decoded data in the output buffer. If not, the compressed data is corrupted, and step 1014 branches to step 1016 to report this and return to FIG. 8 to halt the decompression.

Normally the compressed data is not corrupt, and step 1018 is executed to check whether the length value is less than or equal to the N=8 value that was previously selected. If so, the process continues to step 1100 of FIG. 11 as described below. Most of the time, however, (e.g., approximately ninety-five percent for typical data), the string length is eight symbols or less, and step 1018 branches to step 1020 wherein eight symbols are copied starting from the offset. The output position pointer is then moved the actual length.

In order to reduce the number of comparisons needed during the copying of a substring, the first phase decompression engine processes substrings of N or less symbols and longer substrings differently. If the length of a substring is N or less, then the decompression engine copies N (e.g., eight) symbols into the output buffer (which is guaranteed to have enough space to hold N more symbols), and then adjusts the output position (pointer) by the actual length (e.g., five) of the substring. Note that since N is small, copying of the few extra symbols (which will then be overwritten) is normally faster than copying the substring symbol by symbol in a loop while comparing the number of symbols copied so far against the actual amount needed.

When a literal token is copied or a substring of less than length N (=8) is copied, step 1024 is executed to determine whether there is another token to decode. If not, the fast decoding is done and step 1026 sets the decode status to "OK" or the like and returns to FIG. 8. Otherwise, the process returns to FIG. 9, step 900. Step 900 is again evaluated to determine whether the (now non-zero) input position has exceeded the maximum safe position. Since the input position keeps increasing, eventually it will exceed the maximum safe position at step 900, at which time step 900 will branch to step 902 to calculate a value representing a number of tokens that can be safely decoded for literals and small (length <=8) substrings. If at step 904 this number is zero, then the output position is too close to the end of the output buffer to use the first phase recognition engine, and the decode status is set to OK and the process returns to FIG. 8 to decode any remaining data via the standard decoder 508.

When there is still a safe amount of room in the output buffer at step 904, step 908 sets a new maximum safe input position equal to the actual input position plus the number of safe tokens. If at step 910 the maximum safe input position is not exceeded by a maximum value allowed for it, the process branches to FIG. 10 to decode another literal or substring as described above. If however, the maximum safe input position is exceeded by the maximum value, step 912 sets it to the maximum value. Step 914 checks whether the actual input position exceeds this maximum value. If so, the data is corrupt (step 916). If not, the process branches to FIG. 10 to decode another literal or substring as described above.

FIG. 11 represents the steps generally taken when a substring is greater than eight symbols in length, beginning at step 1100 wherein a last output position variable is set to the output position plus the length. Step 1102 checks whether the last output position is greater than the maximum output position allowed. If so, the data is corrupt, and step 1102 branches to step 1110 to set the status to corrupt and return to FIG. 8. Normally this is not the case, and step 1102 branches to step 1104.

At step 1104, the decompression engine compares the length with a MAX_LENGTH escape code value, which, in general, is a special code indicating that the length is greater than a more simply represented length value, and the actual length has to be decoded from other bits. If so, step 1106 is executed. In step 1106, the decompression engine efficiently uses a sufficiently large substring by copying MAX_LENGTH symbols to the output buffer, until the number of uncopied symbols remaining is not less than MAX_LENGTH. When the decompression engine copies MAX_LENGTH symbols to output, the output position counter is incremented by the MAX_LENGTH value, and a counter of symbols left to copy is decremented by MAX_LENGTH. Any remaining (MAX_LENGTH−1) or less symbols are copied one by one via steps 1112, 1114, 1116 and 1118, wherein the last output position value represents where the output position should be when the last symbol is to be decoded. With this approach, the decompression engine guarantees that the copying of substring of L symbols will require no more than (Length/MAX_LENGTH+MAX_LENGTH−1) comparisons—effectively reducing number of comparisons in almost MAX_LENGTH times for a sufficiently large Length value. Steps 1108 and 1110 handle the situation of not enough data in the input buffer for a given length, which is corrupted data. When finished decoding the long substring, the process returns to FIG. 9 as described above.

In this manner, by guaranteeing that the output buffer always has enough space to store at least N more symbols and then copying one (literal) or N symbols for small lengths less than or equal to N without bounds checking or symbol counting/comparing, the total number of comparisons can be substantially reduced. In one implementation, the use of the fast two-phase LZ77 decoder implementing the present invention improved actual decoding speeds relative to a conventional decoder by about twenty to forty percent (depending on the actual compressed data and hardware used), primarily by reducing the number of comparisons (by about a factor of two).

Figure 12:
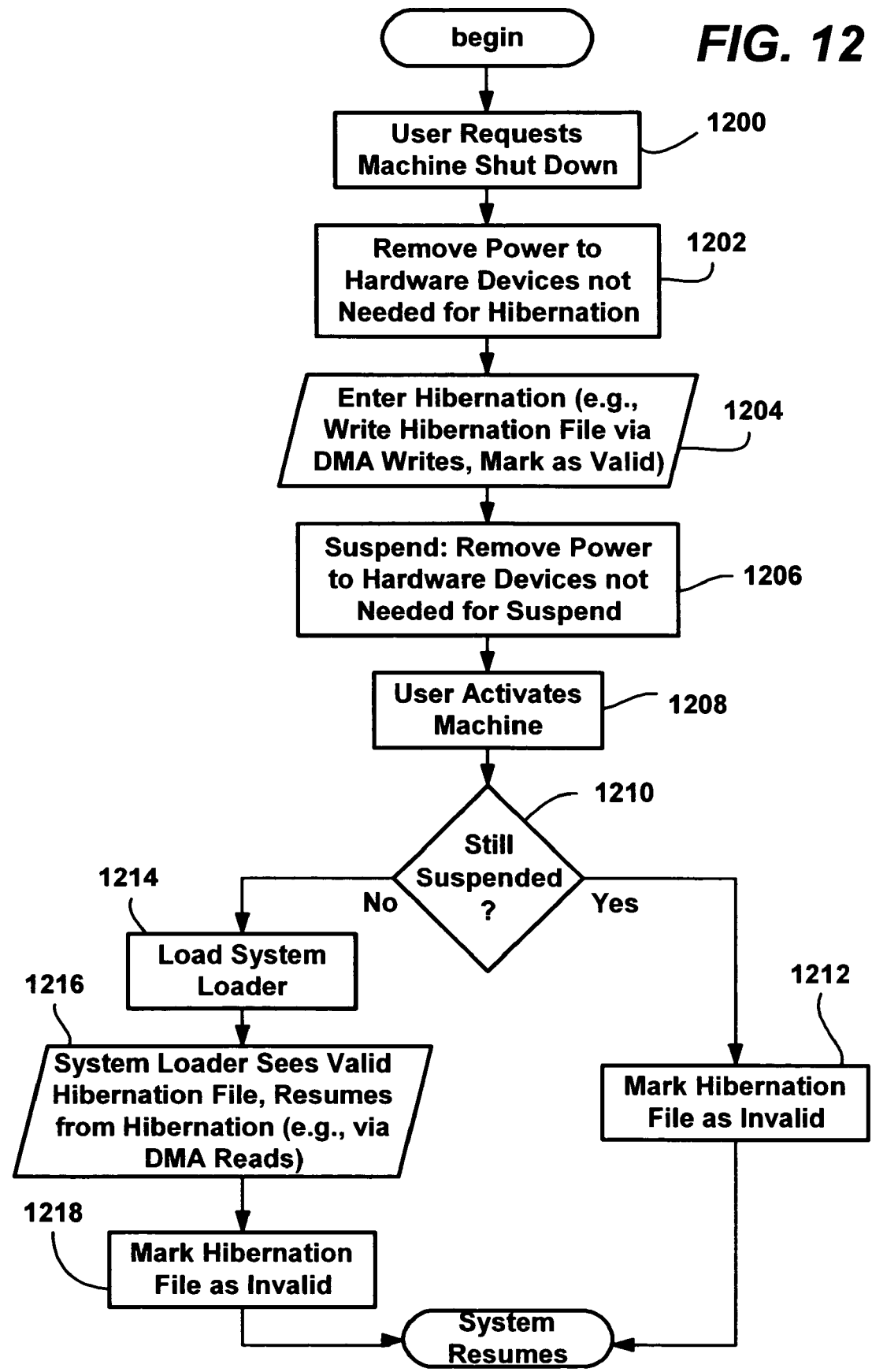
FIG. 12 is a flow diagram generally representing a procedure for combining a suspend/sleep mode with a hibernation mode in accordance with an aspect of the present invention.

While the present invention significantly reduces hibernation entering and resuming times, hibernation still takes a noticeable amount of time. In accordance with another aspect of the present invention, one way in which the perceived time may be shortened, yet without losing the power-safe benefits of hibernation, is to combine a suspend mode with a background hibernation process. FIG. 12 shows a way in which this can be accomplished, for example, beginning at step 1200 when a user "shuts down" a machine, with an option or the like that puts the machine into a suspend or sleep mode (sometimes referred to as an "S4" state). This option may be user-selectable (e.g., "suspend with hibernation" versus normal "suspend") or automatic, e.g., suspend is backed by hibernation without the user being explicitly aware of it.

A suspend/sleep state may be generally accomplished by providing sufficient power to the volatile memory to maintain its contents and shutting down the rest of the hardware devices. Hibernation that backs the suspend state may be further accomplished by removing power to the devices not needed for hibernation (step 1202) while temporarily maintaining power to the hard disk (controller and drive), and preferably the DMA controller. Note that this gives the appearance of instantaneously entering suspend, e.g., the display goes dark, speakers go silent and so forth, (although a perceptive user may notice the hard drive operating for a while longer). The remaining powered-up hardware is then used (e.g., via the DMA process as described above or via a PIO process) to automatically write the memory contents to a valid hibernation file at step 1204. Once the hibernation file is written and marked valid, the hard disk hardware and DMA controller are powered off, as represented in FIG. 12 via step 1206. The system is now in a suspended mode as previously understood, but with a valid hibernation file backing the memory contents as if hibernating.

Step 1208 represents the user activating the machine. Because the system is suspended/asleep, if there was no power outage and the memory is still intact at step 1210, the system may instantly resume from its sleep/suspend state, and marks (e.g., via the hardware/firmware that enables resuming from suspend) the hibernation image as "invalid" since it is not needed (step 1212). However, if a power outage occurred and the user turns the machine back on, the hardware/firmware will load the system loader process (step 1214), which in turn will see a valid hibernation file (step 1216) and resume from hibernation as described above. At step 1218, the hibernation file is marked as invalid by the hibernation engine when the resume is successful, as also described above.

In this manner, the user perceives a near-instantaneous shut down, and a near-instantaneous restart in most cases where the power was not interrupted. However, if power is lost, while the system will not resume operation as fast as from suspend, the user does not lose any of the machine state. As can be readily appreciated, the advantages of both suspend (instant resume) and hibernation (resistance to power outages) are normally achieved, without their disadvantages.

As can be seen from the foregoing detailed description, there is provided improved hibernation for computer systems. Entering and resuming from hibernation is significantly faster by DMA and/a faster decoder. Hibernation may be combined with suspend/sleep modes to provide near instantaneous state preservation yet with the resistance to power outages provided by hibernation.

While the invention is susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention.

What is claimed is:

1. A computer-readable storage medium storing computer-executable instructions which, when executed, implement a method comprising the following:

disabling interrupts on a computer system while resuming from hibernation;

requesting a DMA controller to asynchronously read a set of compressed data from a storage mechanism to an input buffer, the data representing at least some contents of a volatile readable storage memory of the computer system in a previous state;

polling, in intermittent polling operations, a status register to determine when the read from the storage mechanism is complete; and while between polling operations, decompressing at least some data in the input buffer to the volatile readable storage memory.

2. The computer-readable storage medium of claim 1, wherein the method further comprises, loading at least one driver to enable the controller to read the data asynchronously from the storage mechanism.

* * * * *